March 28, 1961  C. J. MALONEY ET AL  2,976,724
INCLUSIVE MATCHING DEVICE
Filed June 24, 1957  3 Sheets-Sheet 1

INVENTORS
Clifford J. Maloney
Clifford P. Weber
BY George Renehan
ATTORNEY

INVENTORS
Clifford J. Maloney
Clifford P. Weber

BY George Renehan
ATTORNEY

March 28, 1961

C. J. MALONEY ET AL 2,976,724

INCLUSIVE MATCHING DEVICE

Filed June 24, 1957

INVENTORS
Clifford J. Maloney
Clifford P. Weber

BY *George Reinhan*

ATTORNEY

United States Patent Office 2,976,724
Patented Mar. 28, 1961

2,976,724
INCLUSIVE MATCHING DEVICE

Clifford J. Maloney and Clifford P. Weber, Frederick, Md., assignors to the United States of America as represented by the Secretary of the Army Filed June 24, 1957, Ser. No. 667,722
6 Claims. (Cl. 73—156)
(Granted under Title 35, U.S. Code (1952), sec. 266)

The invention described herein may be manufactured and used by or for the Government of the United States of America for governmental purposes without the payment to us of any royalty thereon.

This invention relates to a mechanism for comparing patterns of perforations in different records and in which one or more functions such as record feeding, record punching, record sorting, or the stopping of the machine are effected as a result of such comparison or non-comparison between such perforation patterns.

More particularly, it relates to a modification and improvement of the basic mechanism shown and described in U.S. Patent 2,211,094. In the machine shown in this patent, comparison is made between a master card and detail card. In the event that the cards are not identical, the machine reacts to the dissimilarity by performing some function such as punching or sorting of the cards or stopping the machine.

The present invention is made to apply a more selective comparison between the master and detail card whereby a similarity is registered when the master contains within it the perforations of the detail card. This is a variation from the requirement of identity which characterizes the mechanism of U.S. Patent 2,211,094. This type of comparison may be useful in many applications for it permits a selection of all detail cards containing only some of the information appearing on the master card. The limits to this type of comparison are that the detail card shall not contain any perforations not also appearing on the master. Consequently, if the master card is perforated in every position a positive comparison would be recorded with every possible detail card.

In the drawings, Fig. 1 shows a section of the master and detail card sensing mechanism, the reading retaining mechanism and the comparing mechanism. It corresponds generally to Figs. 47 and 50 in U.S. Patent 2,211,094.

The position of the parts in Fig. 1 represents a state wherein the master card contains seven perforations and the detail card three perforations, and each of the three perforations is duplicated in the master card. The new machine accordingly indicates a match. In the description, the right and left sides of Fig. 1 are sometimes referred to as the front and back or forward and rearward parts of the machine respectively.

Figure 1:
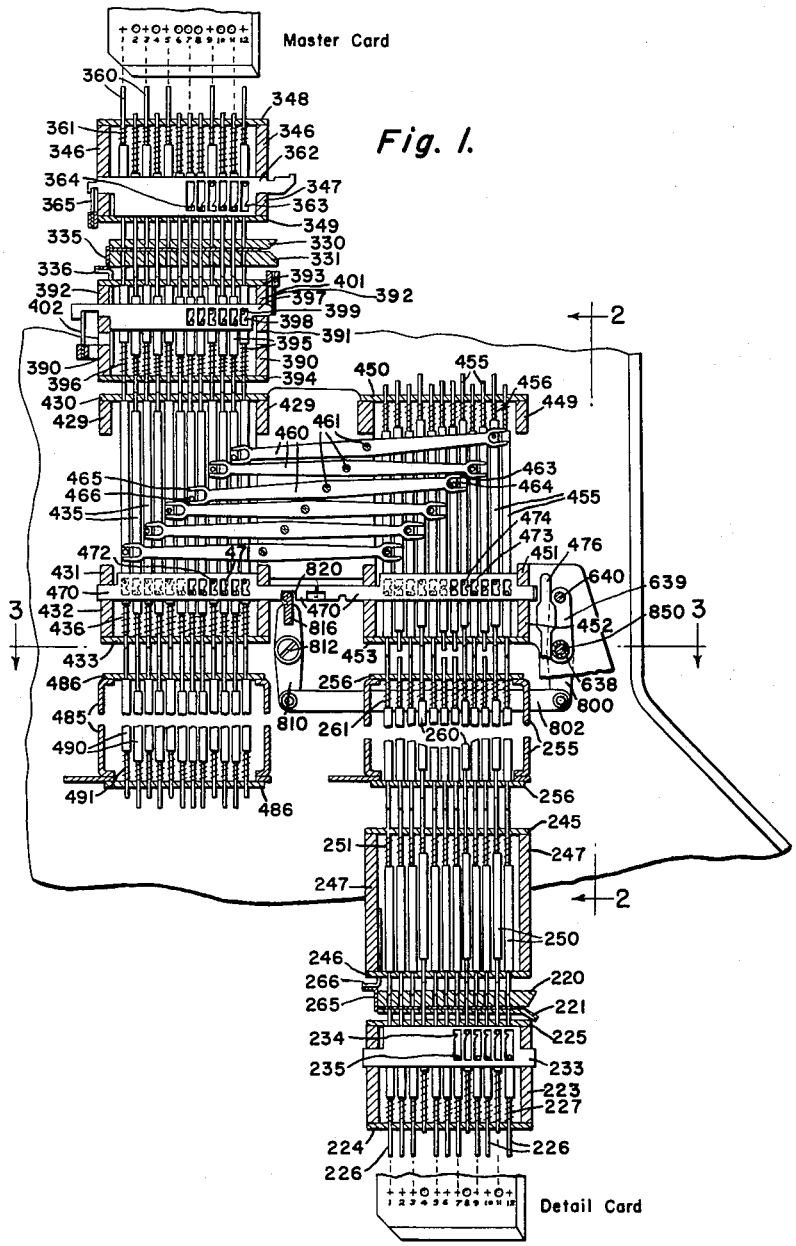
Figure 2:
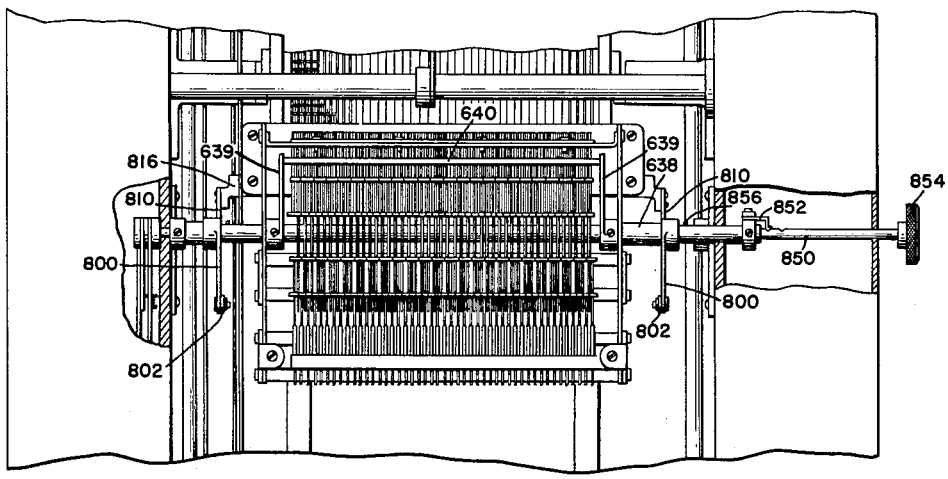
Fig. 2 is a vertical section through the comparing section of the mechanism. It is shown at 2—2 of Fig. 1.
Figure 3:
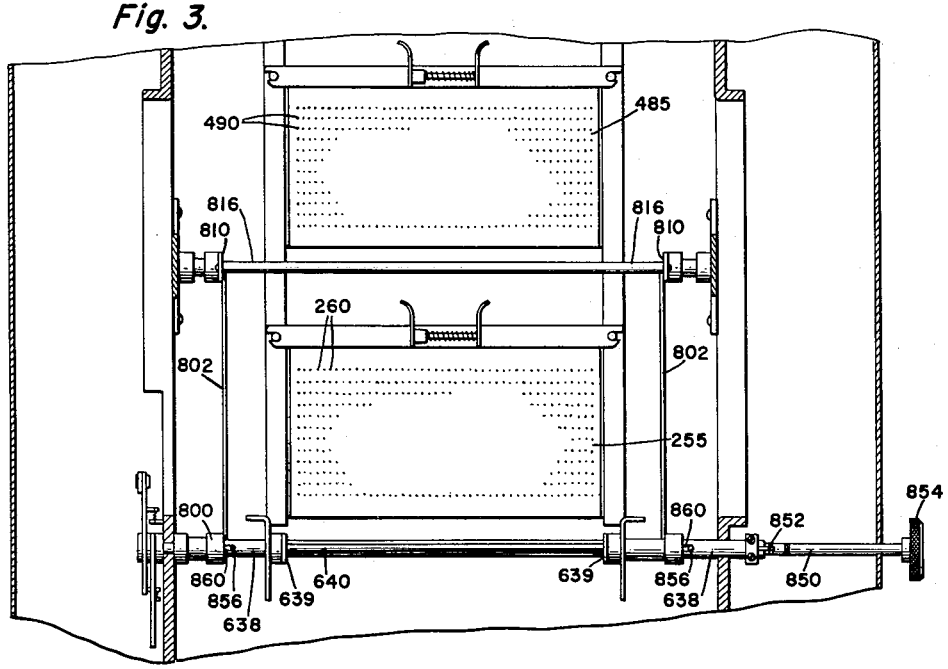
Fig. 3 is a horizontal section through the same mechanism at 3—3 of Fig. 1.

All basic details of this mechanism except as are indicated, are identical with that shown in U.S. Patent 2,211,094.

*Detail card mechanism*

The detail card sensing pin box is shown at 223, with top and bottom plates at 225 and 224 and with sensing pins 226 and springs 227. Latch plate 233 is equipped with locking lugs 234 which engage studs 235 on pins 226. These latch plates are equipped with the necessary actuating mechanism so that the sensing pins can be locked in the extended position where they are normally held by the springs except when they are being pushed back by a non-perforated card position.

The detail card sensing chamber which appears above the sensing pin box, consists of an upper plate 220 and a lower plate 221 spaced apart for receiving the detail card therebetween. Both plates are perforated with a full complement of holes corresponding to the perforation positions in a card. To retain the detail cards in the sensing chamber during the period in which they are sensed, a card stop mechanism is provided. The device comprises an L shaped card stop 265 guided for vertical movement by brackets 266.

In sensing a detail card, the card is moved into position against stop 265 so that the perforations in the card coincide with the positions of the corresponding sensing pins. The detail card sensing pin box is then raised, thereby bringing the sensing pins 226 into contact with the respective card positions. Wherever a perforation appears in a card the pins will pass through and conversely, every non-perforated position will push the sensing pins back against springs 227. In so doing studs 235 are pushed back beyond locking lugs 234. At this point latch plate 233 is moved right into position, thereby latching all sensing pins that have passed through perforations in the card. Further upward movement of the sensing pin box then brings the latched pins into contact with the upper interponent pins 250 displacing them upwards thereby to actuate translator pins 260 and through them the comparing mechanism. The non-latched sensing pins, having been blocked by unperforated positions on the card, are pushed back against the bias of springs 227. When the movement is complete and the sensing pin box lowered, the latch plate is tripped and the cycle of operation may proceed by removing the card and starting again.

The upper or stationary interponent pin box comprises a box-like frame including a perforated upper plate 245 and a perforated lower plate 246 supported by cross bars 247. A plurality of upper pins 250 coacting with and corresponding in number and arrangements to pins 226, are slidably mounted in the perforations in plates 245 and 246 and are urged downwardly against plate 246 by springs 251. These pins serve as interponents to transmit the mechanical representations of perforation patterns from the sensing pin box to the sensing mechanism translator. In order to transmit these representations to the comparing mechanism a removable translator box 255 is interposed between the upper or stationary pin box and the comparing mechanism. This device comprises a rectangular box-like frame including perforated upper and lower plates 256 slidably mounted to permit removal of the unit. A plurality of rows of translator wires 260 coact with and correspond in number and arrangement to pins 250 of the stationary pin box and are slidably mounted in the perforations in plates 256. They are urged downwardly against lower plate 256 by springs 261.

*Master card mechanism*

Master cards are passed through the machine in the same manner as in U.S. Patent 2,211,094. The cards are placed in a master card magazine and are passed serially to suitable feed rolls whereby they are conveyed to a sensing chamber in which their perforated data is sensed and from which they are passed to the master card ejector rolls.

The master card sensing mechanism is similar in function to the detail card sensing mechanism in that it serves to sense or analyze the perforation patterns in master cards and to transmit mechanical representations of such patterns to the comparing mechanism.

The master card sensing chamber comprises an upper plate 330 and a lower plate 331 properly spaced therefrom. Both plates are perforated with a full complement of holes corresponding to the perforation positions in a card. To retain the master cards in the sensing chamber during the period in which they are sensed, a card stop mechanism is provided. This device comprises an L shaped card stop 335 guided for vertical movement by brackets 336.

The master card sensing pin box comprises a pair of cross bars 346 and 347 spanned by an upper plate 348 and a lower plate 349. Each of said plates is perforated with a full complement of holes corresponding to the perforation positions in a card and is arranged to register with the perforations in sensing chamber plates 330 and 331. For sensing the perforations in the master cards, a plurality of rows of sensing pins 360 having flat midportions and reduced ends are slidably mounted in the perforations in plates 348 and 349 and are urged downwardly by springs 361.

As in the detail card sensing box, means are provided for locking all pins 360 that pass through perforations in master cards so that these pins may positively move the associated elements. However, inasmuch as the present embodiment is arranged to operate on ninety column cards and since it is frequently desirable to disable the pins of any selected column, as hereinafter described, separate locking means are provided for the upper and lower zone pins in each longitudinal column. For this purpose two locking slides 362 are interposed between each pair of adjacent longitudinal columns of pins 360 and are provided with extensions arranged to slide in the slots formed by cross bars 346 and 347. In each case, each right hand slide 362 of each group of 2 slides is provided with six rectangular openings having locking faces 363 at its forward end, said locking faces being arranged to coact with extrusions 364 on the foremost six pins 360 of the adjacent right hand column; whereas each left hand slide 362 is provided with six rectangular openings having locking faces 363 at its rearward end, said locking faces being arranged to coact with extrusions 364 on the rearmost six pins 360 of the adjacent left hand column. All of the slides 362 are urged to their rearward or locking position by leaf spring 365 that coacts with shoulders on the rear ends thereof but are held in their forward position by suitable mechanism when the pin box is elevated. The timing is such that the pins 360 that have passed through perforations in a card are locked in their lower positions and impart positive movement to corresponding pins 395 of the reading mechanism during the remaining downward movement of the pin box whereas the pins 360 that have not passed through perforations are held by the card in a stationary position relative to the frame of the machine.

The mechanism for the prevention of the locking of all pins in the event there is no card present in the master card sensing chamber is the same at that shown in U.S. Patent 2,211,094.

*Master card reading retaining mechanism*

Inasmuch as the sensing pins 360 that sense the perforation pattern in a master card are only held in their lowermost positions momentarily, a reading retaining mechanism is provided to retain a mechanical representation of such perforation pattern during the remainder of the cycle, or for several cycles if required. The master card reading retaining mechanism comprises a stationary box-like frame supported by crossbars 390 and top and bottom plates 393 and 394. Each of these plates is perforated with a full complement of holes corresponding to the perforated positions of a card and arranged in register with the holes in the sensing chamber plates. A plurality of rows of reading retaining pins 395 aligned with and corresponding in number and arrangement to sensing pins 360 are slidably mounted in the perforations in plates 393 and 394 and are urged upwardly against plate 393 by springs 396. Springs 396 are substantially stronger than springs 361 so that the lowering of an unlocked sensing pin 360 is ineffective to depress the corresponding reading retaining pin 395. However, since all pins 360 that pass through perforations in records are locked in their lowermost positions unless the associated slide 362 is disabled, these pins are effective to depress the corresponding pins 395 against the tension of springs 396.

In order to retain a mechanical representation of the perforation pattern sensed by pins 360, pins 395 are provided with locking means similar to those employed in the sensing pin box. For this purpose two locking slides 397 are interposed between each pair of adjacent longitudinal columns of pins 395 and are provided with extensions arranged to slide in the slots formed by crossbars 391 and 392. In each case, each right hand slide 397 of each group of two slides is provided with six rectangular openings having locking lugs 398 at its forward end, said locking lugs being arranged to coact with extrusions 399 on the foremost six pins 395 of the adjacent right hand column whereas each left hand slide 397 is provided with six rectangular openings having locking lugs 398 at its rearward end, said locking lugs being arranged to coact with extrusions 399 on the rearmost six pins 395 of the adjacent left hand column. All slides 397 are normally resiliently urged to their rearward or locking position, the right hand slides 397 are urged by leaf springs 401 mounted on forward cross bar 392 and the left hand slides 397 are urged by leaf springs 402 mounted on rear cross bar 390. Thus when one or more reading retaining pins 395 are positively depressed by sensing pins 360 in accordance with the perforation pattern in a card, extrusions 399 ride down the inclined face of locking lugs 398 and locking slides 397 move forwardly against the tension of their springs until the extrusions pass the lower edges of the lugs. Thereupon, slides 397 are shifted rearwardly by their springs 401 or 402 and engage lugs 398 with extrusions 399 to retain the pins 395 in their depressed positions whereby a mechanical representation of the perforation pattern in a card is set up in the reading retaining mechanism, and is retained therein until a new setup is made or until released by other means.

This release mechanism is necessary in order that the locked pins from the previous card may not multilate the following card which has a different perforation pattern. This release mechanism is fully disclosed and described in U.S. Patent 2,211,094. It provides that, at the end of any machine cycle, the mechanical representation of a perforation pattern made in the reading retaining mechanism at the beginning of that cycle may be released to permit the mechanical representation of a new perforation pattern to be set up at the beginning of the succeeding cycle.

Comparing mechanism

This device comprises essentially a master card comparing pin assembly for registering the mechanical representation of the perforation pattern in the master card; a detail card comparing pin assembly for registering the mechanical representation of the perforation pattern in the detail card; comparing levers interconnecting the pin assemblies for causing a partial movement of one or more comparing pins in either assembly in the event of a non-comparison; comparing slides coacting with the comparing pins of both assemblies for registering a non-comparison and comparing slide sensing means to determine the occurrence of a non-comparison.

The master card comparing pin assembly comprises a pair of end frames having a pair of transverse cross bars 429 which serve to support an upper plate 430. The lower portion of the end frames are connected by cross bars 431 and 432 serving to support lower plate 433. Each of the plates 430 and 433 are perforated with a full complement of holes corresponding to the perforation positions of a card and are arranged in register with the holes in lower plate 394 of the reading retaining mechanism. A plurality of rows of master card comparing pins 435, coacting with and corresponding in number and arrangement to reading retaining pins 395, are slidably mounted in the perforations in plates 430 and 433 and are urged upwardly against plate 430 by springs 436. Thus the depression of any pin 395 serves to depress the corresponding pin 435 a similar distance against the tension of its spring 436 so that a mechanical representation of the perforation pattern sensed in a master card is registered by depressing comparing pins 435 when the master card sensing pin box is lowered.

The detail card comparing pin assembly is similar in construction to the master card comparing pin assembly and comprises a pair of end frames having a pair of transverse cross bars 449 which serve to support upper plate 450. The lower portion of the end frames are connected by cross bars 452 which serve to support lower plate 453. Each of the plates 450 and 453 are perforated with a full complement of holes corresponding to the perforation positions in a card and are arranged in register with the holes in upper plate 256 of the detail sensing mechanism translator 255. A plurality of rows of detail card comparing pins 455 coacting with and corresponding in number and arrangement to translator pins 260 are slidably mounted in the perforations in plates 450 and 453 and are urged downwardly against plate 453 by springs 456. Thus the elevation of any translator pin 260 serves to elevate the corresponding pin 455 a similar distance against the tension of its spring 456, so that a mechanical representation of the perforation pattern sensed in a detail card is registered by elevated comparing pins 455 when the detail card sensing pin box is elevated. For convenience of reference pins 435 and 455 are designated by numerals 1 to 12 reading from left to right or back to front in the respective groups.

Interconnecting corresponding pins 435 and 455 of the master and detail comparing pin assemblies respectively are a plurality of sets of forked comparing levers 460 pivotally mounted on transverse rods 461. To conserve space, levers 460 are arranged in six horizontal rows and are arranged in pairs between each pair of adjacent longitudinal columns of pins 435 and 455. In each case, the left hand lever 460 of each pair is provided with a forked forward end 463 encompassing lateral extrusions 464 on the corresponding pin of the adjacent longitudinal column of detail card comparing pins 455 and is provided with a forked rearward end 465 encompassing lateral extrusion 466 on the corresponding pin of the adjacent longitudinal column of master card comparing pins 435. Each adjacent pair of levers is provided with similar forked extensions encompassing lateral extrusions on the pins 455 and 435 of the same longitudinal column.

In the event the perforation patterns in corresponding columns of a master and detail card are identical, it is apparent that a pin 435 will be fully depressed under control of a master card sensing pin 360, for each corresponding pin 455 that is elevated under control of a detail card sensing pin 226. However, in the event of a disagreement between such perforation patterns, one or the other of pins 435 and 455 will be only partially actuated. To effect this result, the forked extensions 463 and 465 on levers 460 are arranged to provide a space between the tines of said forks and the associated extrusions that is equal to one-half the extent of movement of a pin 435 or 455 when fully actuated. For purposes of illustration let it be assumed that a master card comparing pin 7 (Fig. 1) is depressed by its reading retaining pin 395 but that the corresponding detail card comparing pin 455 is not elevated by its translator wire 260. As pin 435 is moved downwardly one-fourth of its ultimate extent of movement, the extrusion 466 thereon contacts the lower tine of forked extension 465 on the associated comparing lever 460 and begins to rock the lever counterclockwise. After pin 435 is moved downwardly one-half of its ultimate extent of movement, lever 460 is rocked sufficiently to engage the lower tine on its forked extension 463 with the extrusion 464 on the associated detail card comparing pin 7 (455). During the remaining downward movement of pin 435, lever 460 continues to rock counterclockwise and serves to elevate pin 7 (455) against the tension of its spring 456 whereby, when pin 435 is fully depressed, pin 455 is elevated a distance equal to one-half of its ultimate extent of movement if raised under control of its detail card sensing pin 226. Thus, if a master card and a detail card are sensed simultaneously but the master card perforation pattern contains a perforation for which there is no counterpart in the detail card perforation pattern, the consequent depression of the master card comparing pin 435 corresponding to such perforation causes a partial elevation of the corresponding detail card comparing pin 455 to its midposition. In the same manner the elevation of a detail card comparing pin 455 in accordance with a perforation in the perforation pattern of a detail card for which there is no counterpart in the perforation pattern of the master card sensed at the same time causes a depression of the corresponding master card comparing pin 435 to its midposition.

In order that the occurrence of a non-comparison or mis-match between the perforation patterns of master and detail cards may be utilized to control machine operations, means are provided to register the partial movements of pins 435 and 455 mechanically. For this purpose, two comparing slides 470 are interposed between each pair of adjacent longitudinal columns of master card comparing pins 435, and are provided with extensions arranged to slide in slots formed by cross bars 431 and 432. In each case, each right hand slide 470, observed from the front of the machine, is provided at its forward end with six rectangular openings having camming faces 471 arranged to coact with leftwardly extending lateral extrusions 472 on the foremost six pins 435 of the adjacent right hand column, whereas, the left hand slide 470 of the pair is provided at its rearward end with six rectangular openings having camming faces 471 arranged to coact with rightwardly extending lateral extrusions 472 on the rearmost six pins 435 of the same longitudinal column. In the same manner, two comparing slides 470 are interposed between each pair of adjacent longitudinal columns of detail card comparing pins 455, and are provided with extensions arranged to slide in slots formed by cross bars 451 and 452. In each case, each right hand slide 470 is provided at its forward end with six rectangular openings having camming faces 473 arranged to coact with leftwardly extending lateral extrusions 474 on the foremost six pins 455 of the adjacent right hand column whereas the left hand slide 470 of the pair is provided at its rearward end with six rectangular openings having camming faces 473 arranged to coact with rightwardly extending lateral extrusions 474 on the rearward six pins 455 of the same longitudinal column. Each slide 470 of the master card comparing pin assembly abuts the corresponding slide 470 of the detail card comparing pin assembly, whereby a leftward movement of the detail card comparing slide 470 serves to move the master card comparing slide 470 a like amount. Conversely, and due to the abutting relationship of the slides, a leftward movement of the master card comparing slide does not produce a corresponding movement of the detail card comparing slide.

The arrangement of camming faces 471 and extrusions 472 is such that the depression of a pin 435 is effective to shift the associated slide to the right as the extrusion passes the cam face (Fig. 1). Similarly, the elevation of a pin 455 is effective through its extrusion 474 and a cam face 473 to shift the associated slide 470 to the right as the extrusion passes the cam face. However, in the event of a full depression of a pin 435, or a full elevation of pin 455, the extrusions 472 or 474 pass beyond the effective portion of cam face 471 or 473, so that the associated slide may be shifted leftwardly by lever means hereinafter described, whereas, in the event of a partial depression of a pin 455, the extrusion 472 or 474 remains abreast of the effective portion of cam face 471 or 473 and positively retains the associated slide in its rightward position (Fig. 1).

For convenience of illustration, cam faces 471 and 473 of comparing slide 470 are shown as pointed projections, and extrusions 472 and 474 of comparing pins 435 and 455 are shown as cylindrical projections. In practice, cam faces 471 and 473 as well as extrusions 472 and 474 are usually provided with flatted marking portions to obtain more effective camming surfaces.

Figure 4:
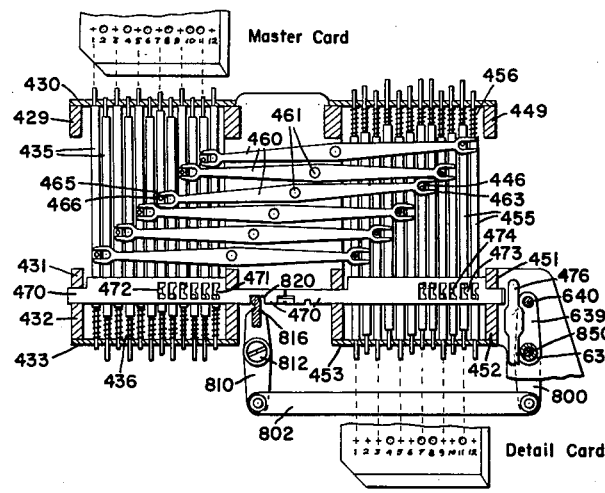
Fig. 4 is a detail of the center comparing section containing the battery of forked comparing levers. The pins and levers are positioned in a manner brought about by the failure of the master card to contain all the information appearing on the detail card thereby producing a block in one position.
Figure 5:
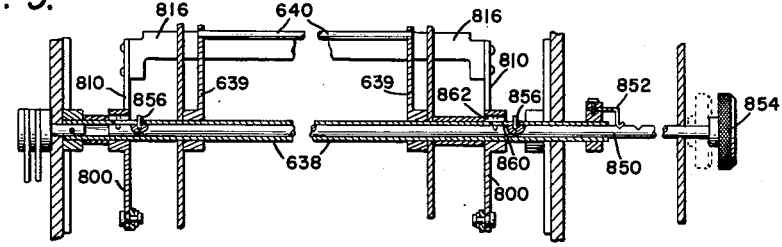
Figs. 5 and 6 are sections through the clutching mechanism showing the manner in which the bail bar comparing mechanism is engaged.
Figure 6:
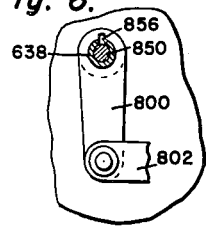
Figure 7:
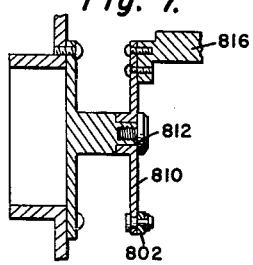
Fig. 7 shows a detail of the bail bar which engages the master card comparing slides.

To determine the occurrence of a non-comparison or mis-match in one or more selected columns, means are provided to sense the positions of comparing slides 470 at the proper time in each machine cycle. For this purpose a plurality of interponents 476 are pivotally connected to manually settable keys and guided for vertical movement. By means of a suitable attached key each interponent 476 may be shifted to an upper or effective position in which a widened portion thereof is aligned with the forward end of a comparing slide 470, or to a lower or ineffective position in which the widened portion is out of the path of movement of slide 470 as shown in Figs. 1 and 4. The interponents are retained in either position by suitable detent springs.

Cooperating with this widened portion of all effective interponents 476 is a transverse comparing slide sensing bail bar 640 which is arranged to be resiliently rocked leftwardly during each machine cycle. Thus, if all pins 435 and 455 in the columns in which interponents 476 are effective in their extreme upper or lower positions as in the case when the perforation pattern in a master and detail card are identical, bail bar 640 is free to move a complete stroke leftward (Fig. 1) and incidentally serves to restore slides 470 to their leftward position. If any pin 435 or 455 is in mid-position as in the case when master and detail card are not identical, an extrusion 472 or 474 coacts with cam face 471 or 473 to prevent the actuation of the corresponding slide 470 and thereby prevent the complete leftward movement of bail bar 640.

This structure makes possible a determination of identity between master and detail cards, said identity being evidenced by a full movement of the bail bar. Conversely, a refusal of movement of the bail bar indicates non-identity which may then be used as a trigger for further action in connection with the cards.

Mechanism for partial comparison

The present invention includes a modification of the described machine whereby a partial comparison of perforations between the master and detail card becomes possible. Specifically, this modification provides for identity to be registered whenever the master card contains all the perforations appearing on the detail card.

The structure incident to this modification includes an additional bail bar which actuates only the rear comparing slides 470. This bar is rocked through a mechanical train including extension levers 800 on bail bar shaft 638. Links 802 connect these levers to supplementary levers 810 which in turn pivot on journals 812. The upper end of levers 810 support the supplemental bail bar 816 and the latter in turn actuates rear slide 470 through indentations 820. Plates 814 support the two individual journals 812 and position the supplementary bail bar with respect to rear comparing slides 470.

In order that the machine may perform its original function of determining identity as well as the new and additional function of partial comparison, it becomes necessary to decouple the supplementary bail train from the front bail shaft 638. This is accomplished by means of clutch shaft 850 which slides longitudinally within hollow bail shaft 638 to thereby couple levers 800 to said hollow shaft. Normally, levers 800 are floating on hollow shaft 638 and each lever hub has a milled slot 862 which coincides angularly with a corresponding slot 860 in the hollow shaft. Clutch shaft 850 includes radial pins 856 which project from slot 860 in the hollow shaft. Longitudinal movement of clutch shaft 850 serves to move radial pins 856 into the key slots 862 of levers 800 thereby causing the levers to work in unison with the front bail bar 639. Withdrawing the clutch shaft removes the radial pins from hubs 800 and reduces the supplementary bail bar to an inactive status. Positioning of the clutch shaft in the *in* and *out* position is accomplished by detent spring 852 which occupies one of two indentations in the clutch shaft. A knurled hand grip 854 outside of the frame permits easy accessibility to the clutching mechanism.

The functioning of this partial comparison mechanism can best be illustrated by means of a specific example. An inspection of the master card (Fig. 1) shows perforations in the 2, 4, 6, 7, 8, 10 and 11 positions of one column. In accordance with these perforations, the corresponding sensing pins 361 are locked in the down or extended position by latch plate 362. These sensing pins in turn depress and lock the corresponding reading retaining pins 395 and through them the comparing pins 435. An inspection of the rear comparing slide 470 shows that the extrusions of comparing pins 2, 4, 6, 7, 8, 10 and 11 appear at the bottom of the respective rectangular openings of comparing slide 470 and the remainder of the extrusion pins are at the top of the same openings. This means that there is no blocking of the master comparing slide which is then free to move leftward. By the same token, comparing levers corresponding to the 2, 4, 6, 7, 8, 10 and 11 positions have moved the corresponding comparing pins 450 into blocking positions and but for the removal of these blocks by corresponding perforations in the detail card the front comparing slide would have seven blocks.

An inspection of the detail card shows that it has perforations in the 4, 8 and 11 positions and by corresponding functioning of the sensing pins 226 operating through the interponent pins 250 and translator wires 260, the comparing pins 4, 8 and 11 are raised thereby removing the blocks from these positions. This still leaves block in positions 2, 6, 7 and 10 which means that the front comparing slide is blocked, whereas the rear slide is unblocked. With interponents 476 raised into position, bail bar 640 will obviously be blocked and the machine will accordingly register a mis-match.

If, on the other hand, the interponents 476 are depressed out of position and with clutch shaft 850 in the *in* or engaged position, the bail bar 640 will not engage the blocked front comparing slide 470 and the supplementary bail bar 816 is free to move the back comparing slide 470 rearward. The resulting movement of bail bar 640 causes the machine to register a match.

A further example of the functioning of the partial comparison mechanism is shown in Fig. 4. In this illustration only the comparing pins, comparing levers and comparing slides together with the bail bar mechanism is shown. The sensing pins, locking slides and interponent pins are omitted since their functioning is similar to that of the previous illustration described with Fig. 1.

Returning to Fig. 4, we find a master card having perforations in positions 2, 4, 6, 8, 10 and 11. These perforations cause a full depression of the corresponding comparing pins and by means of the comparing levers they lift the corresponding detail card comparing pins to midposition thereby introducing blocks in the before-mentioned positions thereby to prevent the front comparing slide 470 from being moved. Considering now the detail card, we find perforations in the 4, 7, 8 and 11 positions. These perforations cause a full lifting of the corresponding detail card comparing pins and accordingly a removal of the blocks already present in the 4, 7, 8 and 11 positions. It does not remove the blocks in the 2, 6 and 10 positions. In addition, the 7 position of the detail card, which position is not perforated in the master card, throws a block in the 7 position in the master card comparing pins. Thus, both front and rear comparing slides are blocked. Therefore, with interponents 476 out of the way and clutch shaft 850 in the engaged position, bail bar shaft 638 cannot move, hence the machine registers a miss-match with whatever attendant action is desired.

Summarizing the functioning of the mechanism we find that whenever a perforation appears in either master or detail card, it automatically sets up a block in the comparing pin section corresponding to the other card. Conversely, such a block introduced by a perforation in any one card is automatically removed by a corresponding perforation in the other card. Thus with identity of perforations, the comparing slides 470 always remain unblocked and the machine registers a match. The present invention involves, in effect, a decoupling of front slide 470 from rear slide 470 so that a match can be registered when the rear slide alone is unblocked. This situation occurs not only with an identity of perforations but also when the master card contains not only all perforations of the detail card but any number of additional perforations. Thus the card comparing mechanism has been modified and extended to include partial comparison where the master card contains all the information of the detail card.

A study of U.S. Patent 2,211,094 reveals that each interponent 476 may be individually shifted up to effective position by means of a key. By selectively raising some interponents and leaving others depressed, it is possible to apply the partial comparison principle to individual columns of perforations. Thus, where interponents are depressed or out of engagement, partial comparison obtains, whereas in columns where interponents are raised perfect comparison must be present in order that the machine shall register a match.

Figure 8:
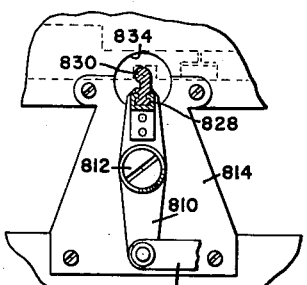
Figs. 8 and 9 are variants of the clutching mechanism of Figs. 5 and 6 wherein disengagement is brought about by complete removal of the bail bar.
Figure 9:
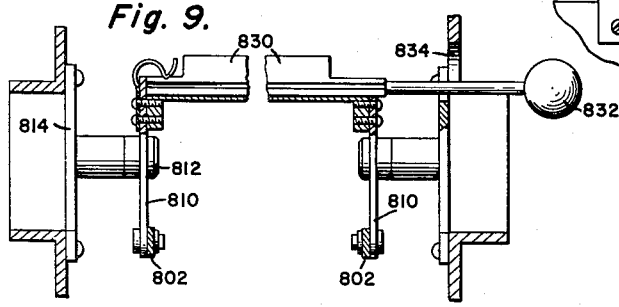

An alternate form of a declutching mechanism is shown in Figs. 8 and 9. In this modification, the levers 800 are fixedly positioned on bail shaft 638 with the result that the linkage including levers 800, links 802 and levers 810 are integral with and operate with bail shaft 638. In order that the mechanism may be rendered inoperative with respect to rear comparing slide 470, supplementary bail bar 830 is removed by sliding it out of its grooved race 828 by means of projecting handle 832.

In the preceding description all structure and functions except where otherwise indicated are the same as that appearing in U.S. Patent 2,211,094, although it is to be noted that this is but one of many possible modifications of an operative machine. Alternative and equivalent mechanisms for any portion of the machine is contemplated within the scope of the present invention.

We claim:

1. In a machine for sensing master and detail records and including a comparing mechanism for sensing comparisons and non-comparisons between perforation patterns in preselected portions of said records and including a master card feeding mechanism and detail card feeding mechanism each of such feeding mechanisms being operative to feed a record to its respective sensing station during each machine cycle, including means for sensing the perforations in the master and detail card to set up a mechanical pattern of such perforations and means for comparing such patterns, the improvement which comprises slide means for registering a matching condition on the basis of a comparison of such patterns, when the perforation pattern of the detail card is contained within but is not coextensive with the perforation pattern of the master card, said slide means including front and rear comparing slides in the detail and master card comparing units respectively, said slides being blocked by the presence of excess card perforations in either the master or detail card comparing units, means for checking the blocking of one of said comparing slides independent of the checking of the blocking of the other slide.

2. A machine in accordance with claim 1 wherein the improvement in the means for checking the blocking of the comparing slides comprises two interlinked sets of bail bars, one set of bail bars serving to check the blocking of the detail card comparing slide and the second set of bail bars serving to check the blocking of the master card comparing slide.

3. A machine in accordance with claim 2 wherein the bail bar for the detail card comparing slide makes contact with said slide through a removable interponent element whereas the bail bar for the master card comparing slide makes direct contact with said master card comparing slide.

4. A machine in accordance with claim 2 wherein the master card bail bar may be disconnected from the detail card bail bar by a declutching mechanism.

5. A machine in accordance with claim 4 wherein said declutching mechanism is associated with the detail card bail bar.

6. A machine for comparing the perforation patterns in master and detail punched cards comprising means for sensing the perforations in a master card and setting up a mechanical pattern of such perforations, a second means for sensing the perforations in a detail card and setting up a mechanical pattern of such perforations, further means for comparing said patterns which further means comprises pivoted levers interconnecting master card and detail card sensing units, adjacent front and rear comparing slides in the detail and master card comparing units respectively, said slides being blocked by the presence of excess card perforations in either the master or detail card comparing units, additional means for determining the presence of a block in one of said comparing slides independent of the presence of a block in the other slide.

References Cited in the file of this patent

UNITED STATES PATENTS

| | | |
|---|---|---|
| 1,591,005 | Stuivenberg | June 29, 1926 |
| 1,853,215 | Lorant | Apr. 12, 1932 |
| 1,897,085 | Thomas | Feb. 14, 1933 |
| 2,211,094 | Braun | Aug. 13, 1940 |
| 2,648,222 | Stuivenberg | Aug. 11, 1953 |
| 2,687,644 | English et al. | Aug. 31, 1954 |